US011829399B1

(12) United States Patent
Pillai et al.

(10) Patent No.: US 11,829,399 B1
(45) Date of Patent: Nov. 28, 2023

(54) EXTRACTING USER-DEFINED ATTRIBUTES FROM DOCUMENTS

(71) Applicant: Schlumberger Technology Corporation, Sugar Land, TX (US)

(72) Inventors: Prashanth Pillai, Pune (IN); Purnaprajna Raghavendra Mangsuli, Pune (IN)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 17/814,383

(22) Filed: Jul. 22, 2022

(51) Int. Cl.
| *G06F 7/00* | (2006.01) |
| *G06F 16/33* | (2019.01) |
| *G06V 30/412* | (2022.01) |
| *G06F 40/279* | (2020.01) |
| *G01V 11/00* | (2006.01) |
| *G06V 30/413* | (2022.01) |

(52) U.S. Cl.
CPC ........ *G06F 16/3347* (2019.01); *G01V 11/002* (2013.01); *G06F 40/279* (2020.01); *G06V 30/412* (2022.01); *G06V 30/413* (2022.01); *G06V 2201/10* (2022.01)

(58) Field of Classification Search
CPC . G06F 16/3347; G06F 40/279; G06V 30/413; G06V 30/412; G06V 2201/10; G01V 11/002

USPC ................ 707/728, 729, 740, 769
See application file for complete search history.

(56) References Cited

U.S. PATENT DOCUMENTS

| 2015/0278691 A1* | 10/2015 | Xia ............... G06F 16/951 706/14 |
| 2021/0233008 A1* | 7/2021 | Gupta ............ G06F 16/355 |
| 2022/0148048 A1* | 5/2022 | Kumar Singh ... G06F 16/24578 |

* cited by examiner

*Primary Examiner* — Md I Uddin
(74) *Attorney, Agent, or Firm* — Michael Guthrie

(57) ABSTRACT

Systems, computer-readable media, and methods are provided. Relevant documents related to a specific entity are identified based on document metadata. Text and associated spatial coordinates are extracted based on relevant document pages. Significant document entities and associated spatial locations are identified. Page ranking is based on the extracted text and the spatial coordinates, the significant document entities, and image vector representations of the pages. A deep learning language model that utilizes the text and the spatial coordinates, layout information of the document entities, and the image vector representations of the pages is used to extract the user-defined attributes from the relevant document pages. First attribute values associated with the user-defined attributes are aggregated from the pages of one of the relevant documents into a single record. Second attribute values associated with the user-defined attributes are aggregated across the relevant documents. Aggregated records, including a first and second attribute, are written to a database.

21 Claims, 10 Drawing Sheets

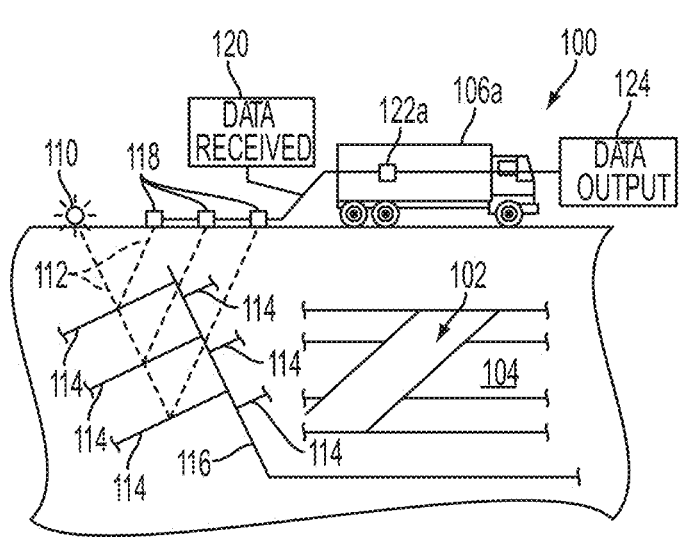
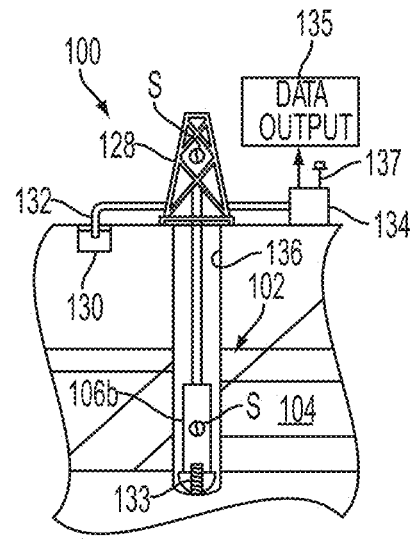
FIG. 1A
FIG. 1B
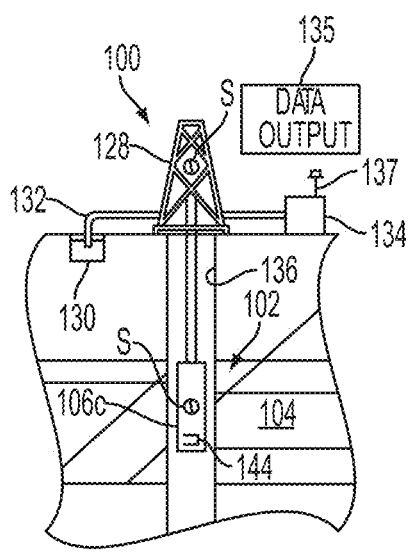
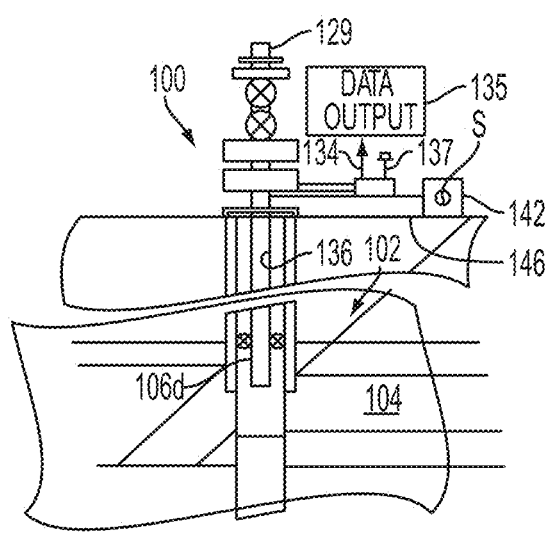
FIG. 1C
FIG. 1D

EXTRACTING USER-DEFINED ATTRIBUTES FROM DOCUMENTS

BACKGROUND

Oil exploration and production companies invest considerable time and money to extract information from unstructured data such as, for example, technical reports, logs, surveys to aid strategic decisions, reports regarding new well drilling, planning and production schedules, etc. Current methods of extracting information from unstructured data include domain experts manually extracting the data from various unstructured data sources. When extracting information such as, for example, well header attributes, pressure, volume, temperature (PVT) data, etc. from the above-mentioned sources, different challenges may be encountered such as diverse and non-standard document and page formats, poor print quality, varied fact representations, and domain-specific semantics, thereby making information extraction more difficult.

SUMMARY

Embodiments of the present disclosure may provide a method for extracting text associated with user-defined attributes from multiple documents. Relevant documents related to a specific entity are identified from storage based on document metadata. Text and associated spatial coordinates are extracted based on pages of the relevant documents. Significant document entities and associated spatial locations are identified based on the pages of the relevant documents through page layout analysis. The pages of the relevant documents are ranked based on the extracted text and the spatial coordinates, the identified significant document entities, and image vector representations in the pages. User-defined attributes are extracted from the pages of the relevant documents using a deep learning language model that utilizes the text and the spatial locations, layout information of document entities, and the image vector representations of the pages. First attribute values, associated with the user-defined attributes, from at least some of the pages of one of the relevant documents are aggregated into a single record. Second attribute values associated with the user-defined attributes are aggregated across the relevant documents. Aggregated records are written to a database, each of the aggregated records including a first attribute or a second attribute.

In an embodiment of the method, the method includes processing, by attribute-specific parsers executing on a computing device, extracted geographic coordinates, date-specific attributes, and quantities associated with units of measurement.

In an embodiment of the method, the specific entity is either a specific oil well or is associated with one from a group consisting of a wellbore, a field, and a prospect, wherein the prospect is an area of exploration in which hydrocarbons have been predicted to exist.

In an embodiment of the method, the relevant documents are reports related to the specific entity.

In an embodiment of the method, the ranking further includes ranking the pages of the relevant documents based on at least one retrieval method, and the at least one retrieval method includes term frequency-inverse document frequency (TFIDF) or Okapi BM25.

In an embodiment of the method, the significant document entities include headings, paragraphs, tables, forms, figures, and logs.

In an embodiment of the method, the user-defined attributes are entity-specific attributes and each of the entity-specific attributes is extracted by at least one of a named entity recognition task and an extractive question-answering task.

In an embodiment of the method, an attribute value is aggregated across multiple sources based on at least one of a majority vote from among the multiple sources, a confidence probability of the attribute value from among the multiple sources, source metadata, and source priority.

Embodiments of the present disclosure may also provide a computer system for extracting text associated with user-defined attributes from multiple documents. The computer system includes at least one processor and at least one memory connected with the at least one processor. The at least one processor is configured to perform multiple operations. According to the multiple operations, relevant documents related to a specific entity are identified from storage based on document metadata. Text and spatial coordinates of the text are extracted based on pages of the relevant documents. Significant document entities and associated spatial locations are identified based on the pages of the relevant documents through page layout analysis. The pages of the relevant documents are ranked based on the extracted text and the spatial coordinates, the identified significant document entities, and image vector representations in the pages. User-defined attributes from the pages of the relevant documents are extracted using a deep learning language model that utilizes the text and spatial locations, page layout information, and the image vector representations of the pages. First attribute values associated with the user-defined attributes from at least some of the pages of the relevant documents are aggregated into a single record. Second attribute values associated with the user-defined attributes are aggregated across the relevant documents. Aggregated records are written to a database, each of the aggregated records including a first attribute or a second attribute.

Embodiments of the present disclosure may also provide a non-transitory computer-readable medium having instructions for a processor recorded thereon to configure the processor to perform multiple operations. According to the operations, relevant documents related to a specific entity are identified from storage based on document metadata. Text and spatial coordinates of the text are extracted from pages of the relevant documents. Significant document entities and associated spatial locations are identified based on the pages of the relevant documents through page layout analysis. The pages of the relevant documents are ranked based on the extracted text and the spatial coordinates, identified significant document entities, and image vector representations of the pages. User-defined attributes from the pages of the relevant documents are extracted based on a deep learning language model utilizing the text and the spatial coordinates, page layout information, and image vector representations of the pages. First attribute values associated with the user-defined attributes from at least some of the pages of the relevant documents are aggregated into a single record. Second attribute values associated with the user-defined attributes are aggregated across the relevant documents. Aggregated records are written to a database, each of the aggregated records including a first attribute or a second attribute.

Embodiments of the present disclosure may further provide a computing system including: a means for identifying relevant documents related to a specific entity from storage based on document metadata; a means for extracting text and spatial coordinates of the text based on pages of the relevant documents; a means for identifying significant document entities and associated spatial locations of the significant document entities based on the pages of the relevant documents through page layout analysis; a means for ranking the pages of the relevant documents based on the extracted text and the spatial coordinates, identified significant document entities, and image vector representations of the pages; a means for extracting user-defined attributes from the pages of the relevant documents using a deep learning language model that utilizes the text and spatial coordinates, page layout information, and the image vector representations of the pages; a means for aggregating first attribute values associated with the user-defined attributes from at least some of the pages of the relevant documents into a single record; a means for aggregating second attribute values associated with the user-defined attributes across the relevant documents; and a means for writing aggregated records to a database, each of the aggregated records including a first attribute value or a second attribute value.

Embodiments of the present disclosure may further provide a computing system configured to: identify relevant documents related to a specific entity from storage based on document metadata; extract text and spatial coordinates of the text based on pages of the relevant documents; identify significant document entities and associated spatial locations of the significant document entities based on the pages of the relevant documents through page layout analysis; rank the pages of the relevant documents based on the extracted text and the spatial coordinates, the identified significant document entities, and image vector representations in the pages; extract user-defined attributes from the pages of the relevant documents using a deep learning language models that utilizes the text and spatial locations, page layout information, and the image vector representations of the pages; aggregate first attribute values associated with the user-defined attributes from at least some of the pages of the relevant documents into a single record; aggregate second attribute values associated with the user-defined attributes across the relevant documents; and write aggregated records to a database, each of the aggregated records including a first attribute value or a second attribute value.

Thus, the computing systems and methods disclosed herein are more effective methods for processing collected data that may, for example, correspond to a surface and a subsurface region. These computing systems and methods increase data processing effectiveness, efficiency, and accuracy. Such methods and computing systems may complement or replace conventional methods for processing collected data. This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

DESCRIPTION OF EMBODIMENTS

Figure 2:
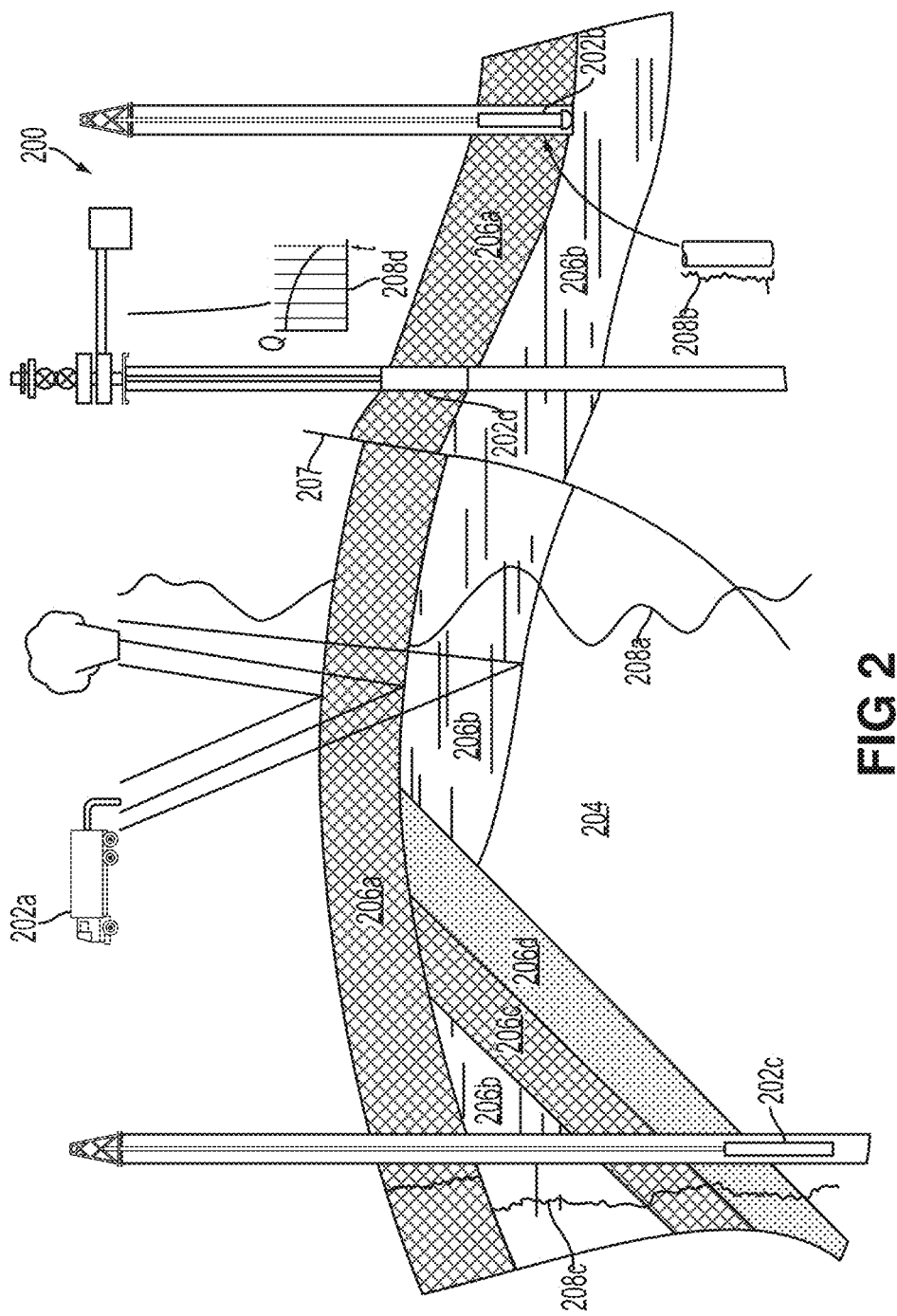

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106c suspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106c may be operatively connected to, for example, geophones 118 and a computer 122a of a seismic truck 106a of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106c to measure downhole parameters which relate to, for example porosity, permeability, fluid composition and/or other parameters of the field operation.

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106d in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202a, 202b, 202c and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1D, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
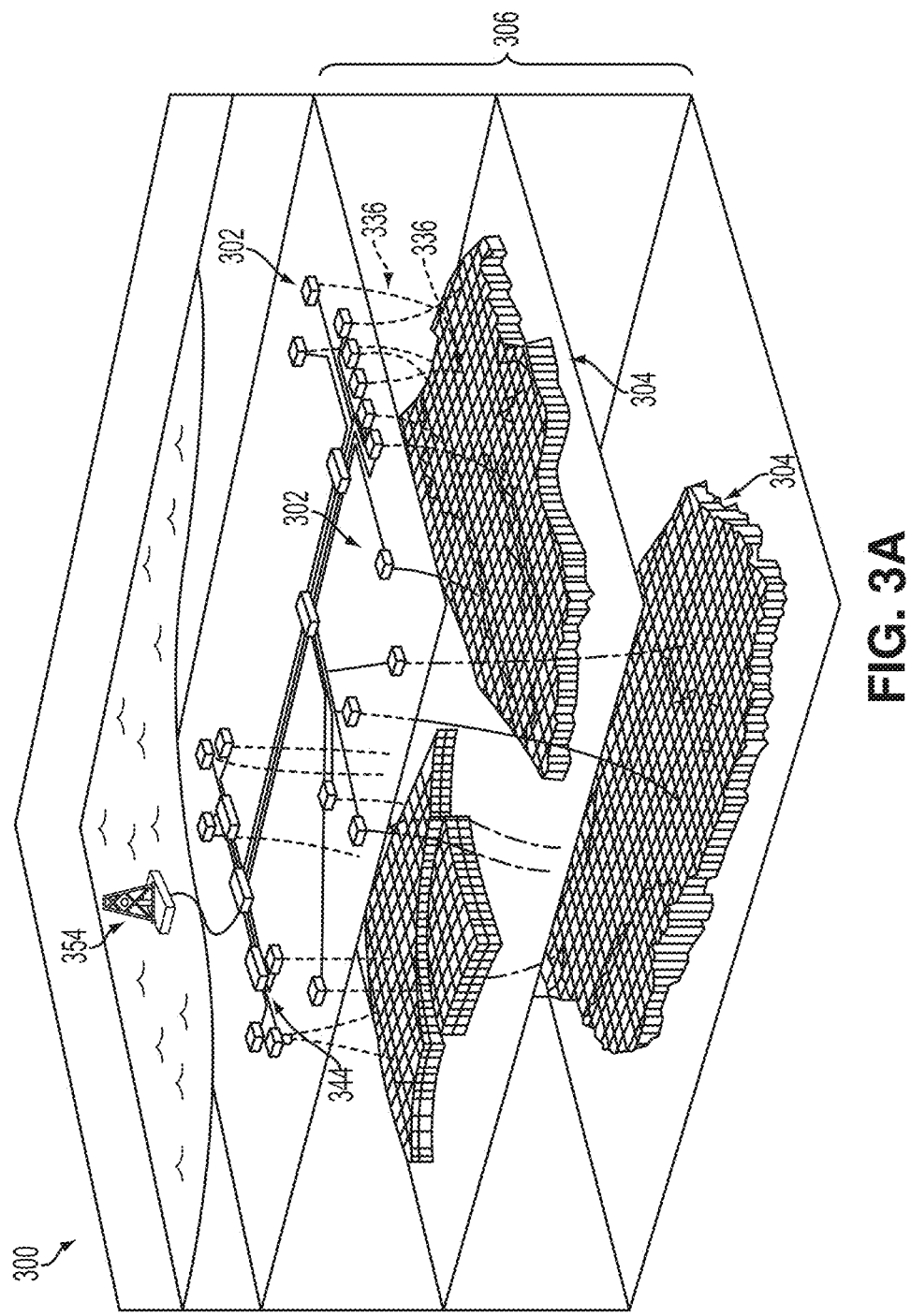

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the Earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
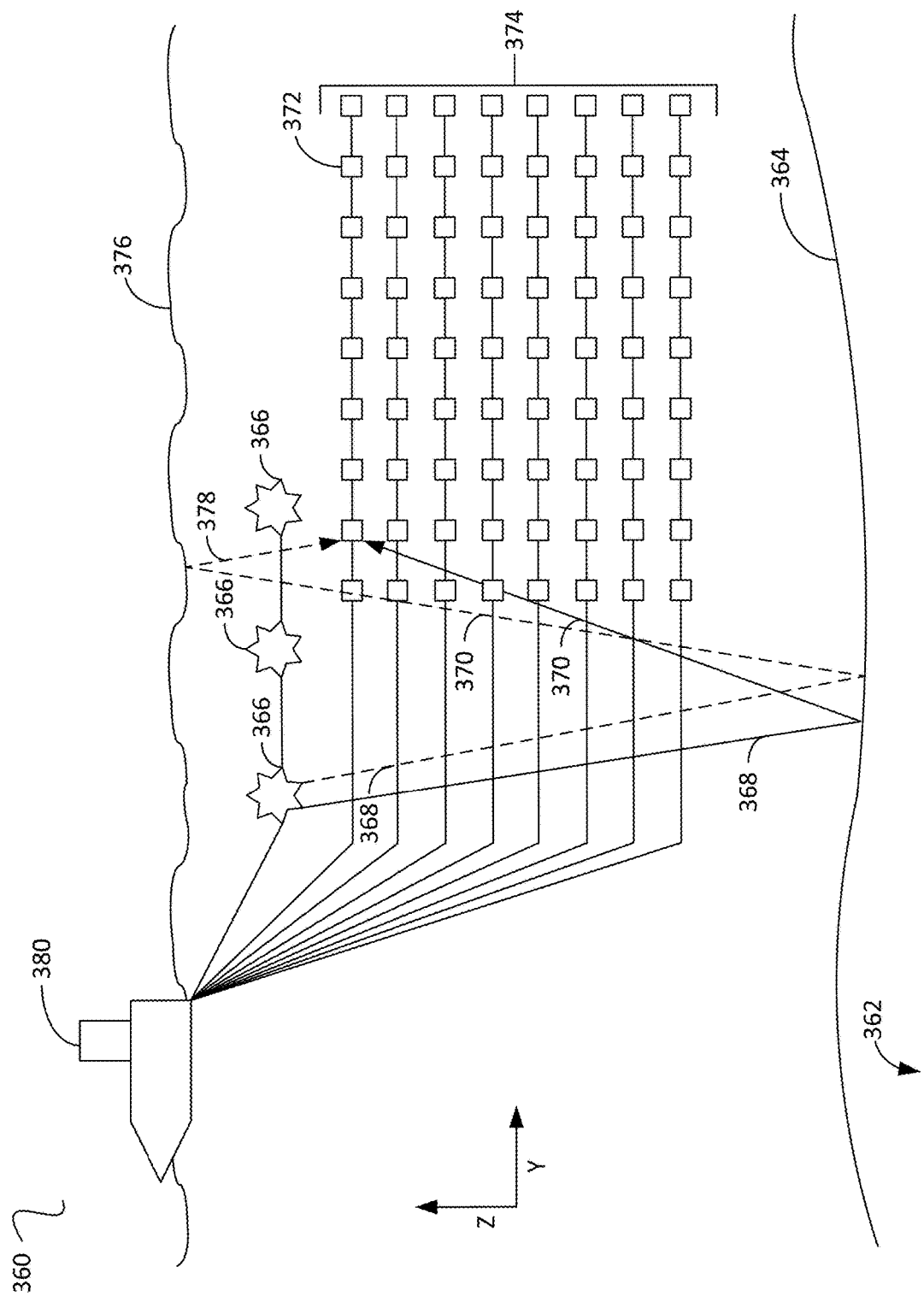

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362. Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Figure 4:
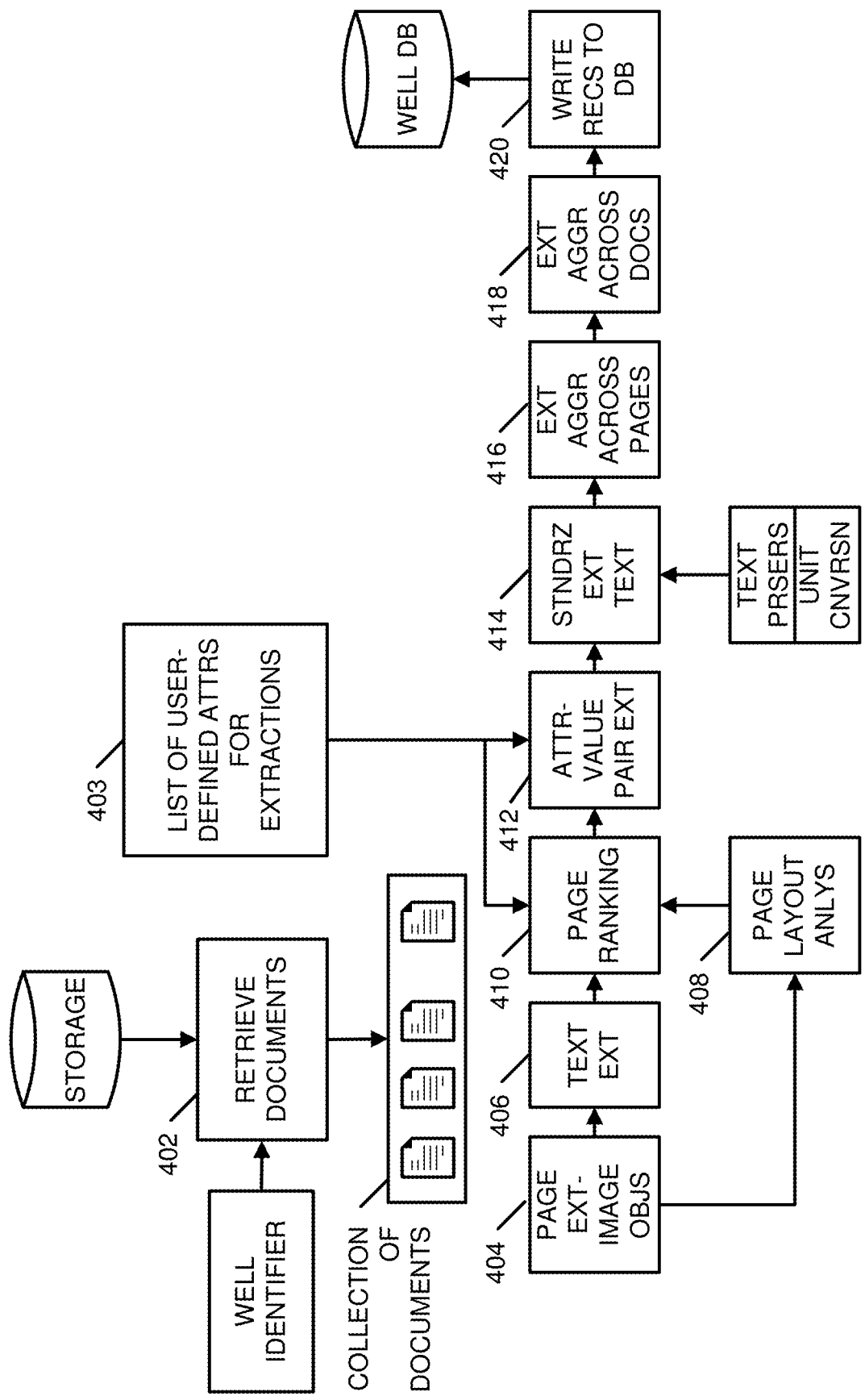
FIG. 4 illustrates an example workflow of a method for extracting text associated with user-defined attributes from multiple documents, according to an embodiment.

FIG. 4 illustrates an example machine learning workflow for well header attribute extraction. At 402, documents associated with a particular well identifier may be identified and retrieved from storage. In one embodiment, the documents may be any relevant reports including, but not limited to, final well reports, completion reports, and drilling reports.

Next, at 404, each page of the retrieved documents may be extracted into corresponding image objects. Using optical character recognition (OCR) or PDF parsers, text and corresponding spatial coordinates (positions of bounding boxes surrounding text) may be extracted from the image objects at 406.

At 408, page layout analysis may be performed. This may include identifying significant entities in documents and their corresponding spatial locations. The significant entities may include, but not be limited to, headings, paragraphs, tables, forms, figures, and logs.

At 410, a list of well header attributes, or alternatively, any user-defined attributes 403 may be used along with page layout information, including entity labels, and retrieval methods that may include, but not be limited to, term frequency-inverse document frequency (TFIDF) and Okapi best matching 25 (Okapi BM25) may be used to rank pages in a document for efficient attribute or fact extraction.

At 412, a deep learning language model including, but not limited to, Bidirectional Encoder Representations from Transformers (BERT), variants, and probabilistic models as well as relative spatial positions of text may be used to extract attribute values or facts in a page using an extractive question-answering task or a named entity recognition task. In various embodiments, each well header or other attribute to be extracted may be extracted by a query generator module using an extractive question answering task, or by a named entity recognition task. In other embodiments, the image object, text, and text layout of a page can be used either by a fusion of multiple models or a single model to perform attribute value or fact extraction.

At 414, attribute specific text parsers may be used to process and standardize extracted geographic coordinates, date-specific attributes, and units of measurement associated with quantities. In some embodiments, a unit conversion module may be used to standardize attributes to a common measurement system.

At 416, attribute values may be extracted across multiple pages in a document. The extracted information may be aggregated into a single record using majority vote, confidence, page type, extraction source, as well as other information.

When values of a particular attribute vary among relevant pages, a majority vote may determine which value of the attribute will be aggregated. The majority vote involves determining which attribute value of the particular attribute was extracted a majority of the time. For example, an attribute, depth, may have an attribute value of 500 meters on one or more pages of a document, and may have an attribute value of 501 meters on one or more other pages of the document. A majority vote method determines which attribute value for the attribute, depth, was extracted a majority of times from the relevant pages.

Confidence refers to a probability that the deep learning language model such as, for example, a transformer-based language model, extracted a correct attribute value from the relevant pages. The confidence probability may be obtained from the deep learning language model or any other machine learning model architecture used for extraction in some embodiments.

Page type refers to whether a page includes text only, tables, figures, forms, etc. Attribute values extracted from pages of a certain page type may be given a greater weight than attribute values of a same attribute extracted from other page types when determining which attribute value of an attribute to include in an aggregation.

Similar to page type, extracted attribute values from some extraction sources may be given a greater weight than extracted attribute values of a same attribute from other extraction sources. For example, attribute values extracted from tables may be given a greater weight than attribute values extracted from a paragraph in some embodiments. Thus, attribute values extracted from those greater weight extraction sources may be given a greater weight than attribute values of a same attribute extracted from lower weight extraction sources when determining which attribute value of an attribute to include in an aggregation.

At 418, extraction aggregation of attribute values may occur across documents using document priority, confidence, and majority vote. That is, document priority of a document from which an attribute value is extracted, a confidence regarding accuracy of the extracted attribute value, and a number of documents from which a same attribute value is extracted may be taken into consideration during aggregation.

According to some embodiments, a priority of a document from which attribute values may be extracted may determine a weight given to the extracted attribute values during aggregation.

Confidence, according to some embodiments, refers to an average probability that an extracted attribute value is correct as determined by the deep learning language model or any other machine learning model in other embodiments.

A weight of attribute values, in some embodiments, may be determined by majority vote. That is, an attribute value of an attribute extracted from a greater number of documents may be given greater weight than other attribute values of a same attribute extracted from fewer documents when aggregating attribute values across documents.

At 420, aggregated attribute values may be written to a database, which may be a well database is some embodiments.

Figure 5:
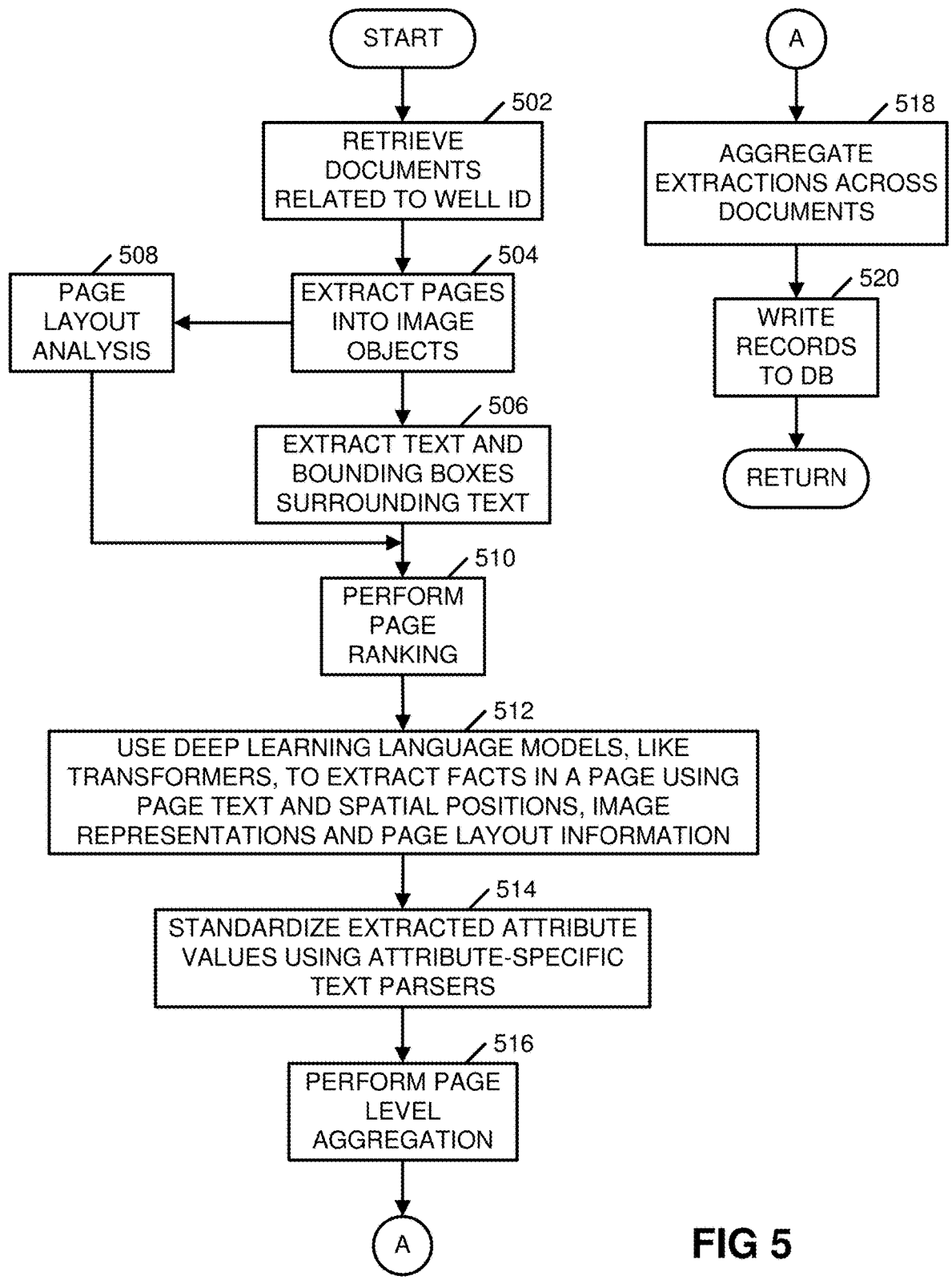
FIG. 5 illustrates a flowchart of an example method for extracting text associated with user-defined attributes from multiple documents, according to an embodiment.

FIG. 5 is a flowchart of an example process for extracting attribute values from documents according to embodiments. The process may begin by retrieving relevant documents related to a well identifier (act 502). Metadata may be used to select the relevant documents in some embodiments. Pages of the relevant documents related to the well identifier then may be extracted into image objects (act 504). Page layout analysis may be performed on the image objects to identify significant document entities in a document including, but not limited to, headings, paragraphs, tables, forms, figures, and spatial locations thereof (act 508). Further, text may be extracted and spatial locations of bounding boxes surrounding the text may be identified (act 506). In some embodiments, acts 506 and 508 may be performed in parallel.

Next, page ranking of pages in a document may be performed (act 510). In some embodiments, page ranking may be performed according to TFIDF or Okapi BM25. The page ranking may be performed based on occurrences of well header attributes from a provided list of well header attributes and occurrences of entity labels that correspond to attributes from the provided list of well header attributes (act 510). Alternatively, page ranking may be performed based on occurrences of user-defined attributes and corresponding entity labels. Page ranking can also include supplementary information like page layout information on the document entities and vector representations of the image information in the pages.

One or more deep learning language models such as a transformer-based language model, which may include, but not be limited to, BERT and Okapi BM25, along with relative spatial positions of text, image representations of pages, and page layout information may be used to extract facts in a page (act 512). In various embodiments, the facts may include attribute names and corresponding attribute values.

The extracted attribute values may be standardized using attribute-specific text parsers (act 514). For example, according to various embodiments, one or more date parsers may parse a date to produce the date in a standardized format, one or more latitude longitude parsers may parse latitude and longitude to produce the latitude and longitude in a standardized format, and measurements may be parsed by one or more quantitative parsers to produce the measurements in a standard format.

Page level aggregation of attribute value pairs may be performed (act 516). As previously mentioned, conflicting values may be resolved, according to various embodiments, by majority vote, confidence probability that an attribute value pair is correct, page type from which the attribute value pair is extracted, and extraction source (figure, table, heading, paragraph, form, etc.)

Next, attribute value pairs may be aggregated across documents (act 518). Conflicts in extracted attribute value pairs across documents may be resolved, according to some embodiments, based on priority of a source document, transformer-based language model confidence that the attribute value pair is correct, an attribute value pair occurring in a majority of documents, and a priority of an extraction source.

The aggregated extracted attribute value pairs then may be written to records of a database, which may be a well database in some embodiments.

Figure 6:
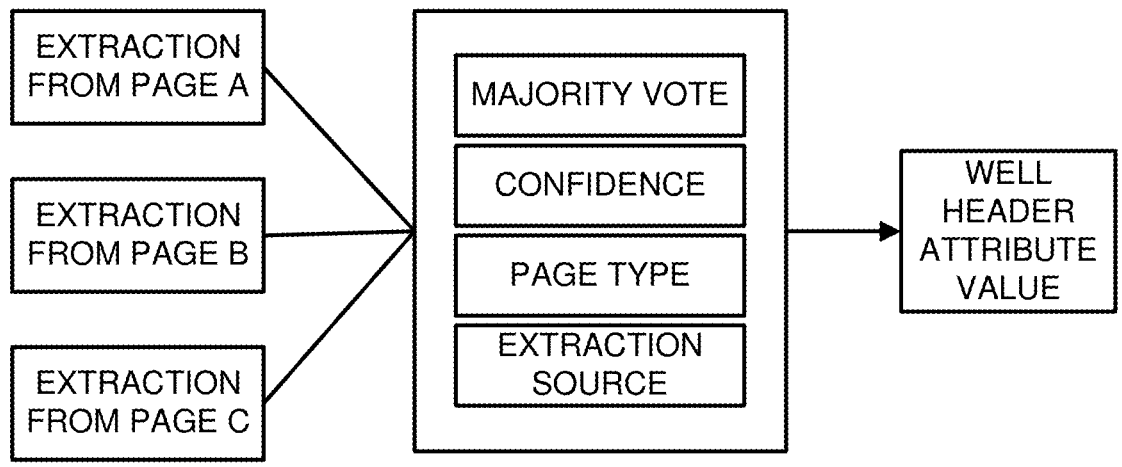
FIG. 6 illustrates a method for resolving conflicts among attribute values extracted from pages of a document according to various embodiments.

FIG. 6 illustrates an example of how attribute value conflicts within pages of a document may be resolved according to some embodiments. As an example, an attribute value pair may be extracted from pages A, B, and C. Suppose the attribute value pair, depth, 499 feet, is extracted from page A, the attribute value pair depth, 500 feet, is extracted from page B, and the attribute value pair depth, 500 feet, is extracted from page C. Based on a majority vote, the conflict would be resolved to depth, 500 feet.

Continuing with the same example, a confidence that the extracted attribute value pair is correct is obtained from the transformer-based language model being used. For example, the confidence that the attribute value pair, depth, 499 feet, is correct may be 85%, while the confidence that the attribute value pair depth, 500 feet is correct may be 92%.

According to some embodiments, the higher the confidence probability, the greater a weight that may be applied to the attribute value pair when resolving conflicts.

Next, a page type of pages A, B, and C may be considered. For example, page A may include a header, a table, and text, page B may include a figure, and page C may include paragraphs of text. According to embodiments, attribute value pairs extracted from some page types may be given more weight than the attribute value pairs extracted from other page types.

Extraction source also may be considered when resolving conflicts in attribute values. For example, in some embodiments, attribute values extracted from certain sources such as figures may be given more weight than attribute values extracted from a table or a paragraph.

Although FIG. 6 shows attribute value pairs being extracted from three different pages of a document, attribute values may be extracted from fewer than three different pages or more than three different pages.

Figure 7:
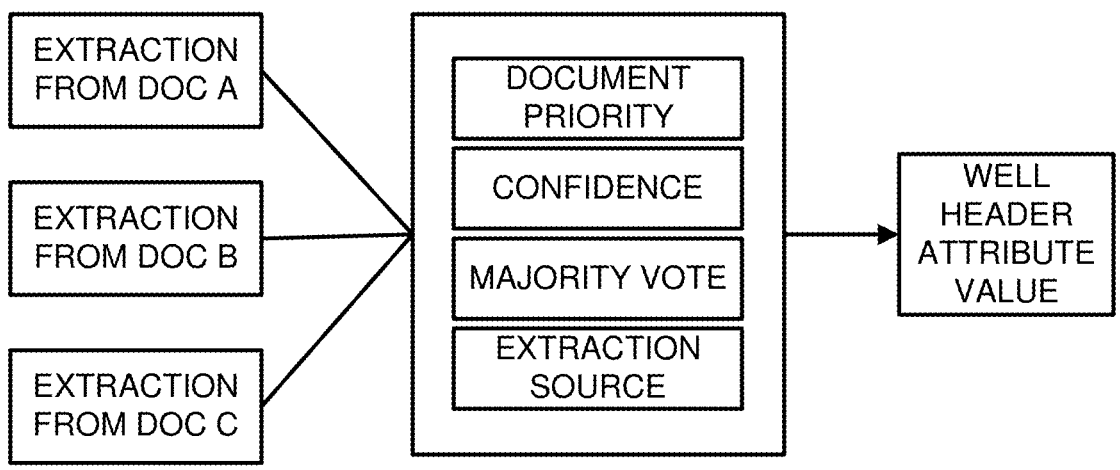
FIG. 7 illustrates a method for resolving conflicts among attribute values extracted from multiple documents according to various embodiments.

FIG. 7 illustrates an example of how attribute value conflicts among different documents may be resolved during aggregation across documents according to some embodiments. An attribute value pair may be extracted and aggregated from each of documents A, B, and C. As an example, suppose the attribute value pair, depth, 499 feet, is extracted from document A, the attribute value pair, depth, 500 feet, is extracted from document B, and the attribute value pair, depth, 500 feet, is extracted from document C. Based on a majority vote, the conflict would be resolved to depth, 500 feet, because this attribute value pair occurs in a majority of documents.

Continuing with the same example, a confidence probability that the extracted attribute value pair is correct is obtained from a transformer-based language model being used. For example, the confidence that the attribute value pair depth, 499 feet is correct may be 85%, while the confidence that the attribute value pairs, depth, 500 feet, are correct may be 92%. In this example, the attribute value pair, depth, 500 feet, may be given greater weight when resolving a conflict between the attribute value pairs of, depth, 499 feet, and depth, 500 feet.

Next, a document priority of documents A, B, and C may be considered. For example, document A may be a type of report that has a higher priority than other types of reports, or document A may be a type of report that was generated more recently than another type of report. According to various embodiments, the document may have a priority based on the type of report or based on how recently the report was generated. In other embodiments, document priority may be determined using other methods. According to the various embodiments, attribute value pairs extracted from higher priority documents may be given more weight than the attribute value pairs extracted from lower priority documents.

Extraction source also may be considered when resolving conflicts in attribute values. For example, in some embodiments, attribute values extracted from certain sources such as figures may be given more weight than attribute values extracted from a table or a paragraph when resolving conflicts among attribute vales of a same attribute during aggregation.

Although FIG. 7 shows attribute value pairs being extracted from three different documents, attribute values may be extracted from fewer than three different documents or more than three different documents.

Figure 8:
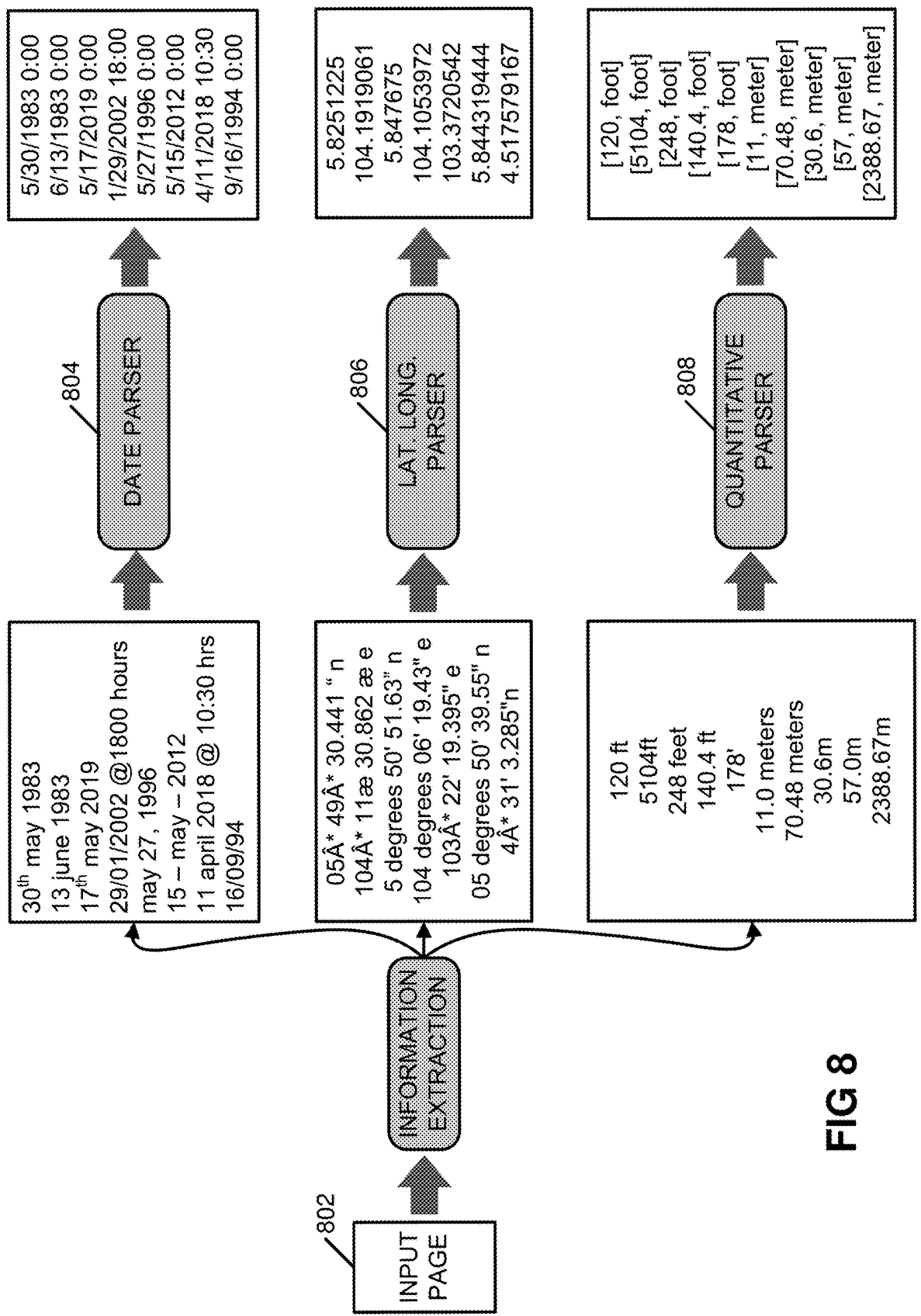
FIG. 8 illustrates a method of processing and standardizing date attribute values, geographic attribute values, and quantity attribute values associated with a unit of measurement.

FIG. 8 shows examples of attribute-specific parsers parsing and standardizing various attribute values according to various embodiments. For example, information may be extracted from an input page 802. The information may include dates, positional coordinates, and measurements. Dates, such as "30 may 1983", "29/01/2002 @ 1800 hours", and "11 Apr. 2018 @ 10:30 hrs", respectively, may be parsed and standardized by a date parser 804 to produce "5/30/1983 0:00", Jan. 29, 2002 18:00", and "4/11/2018 10:30" according to various embodiments. Positional coordinates (longitude and latitude), such as [5 degrees 50' 51.63" n], [104 degrees 06' 19.43" e], and [05 degrees 50' 39.55" n], respectively, may be parsed and standardized by a latitude longitude parser 806 to "5.847675", "104.1053972", and "5.844319444" according to various embodiments. Measurements, such as "120 ft", "140.4 ft", and "30.6m", respectively, may be parsed and standardized by a quantitative parser 808 to "[120, foot]", "[140.4, foot]", and "[30.6, meter]" according to various embodiments.

Figure 9:
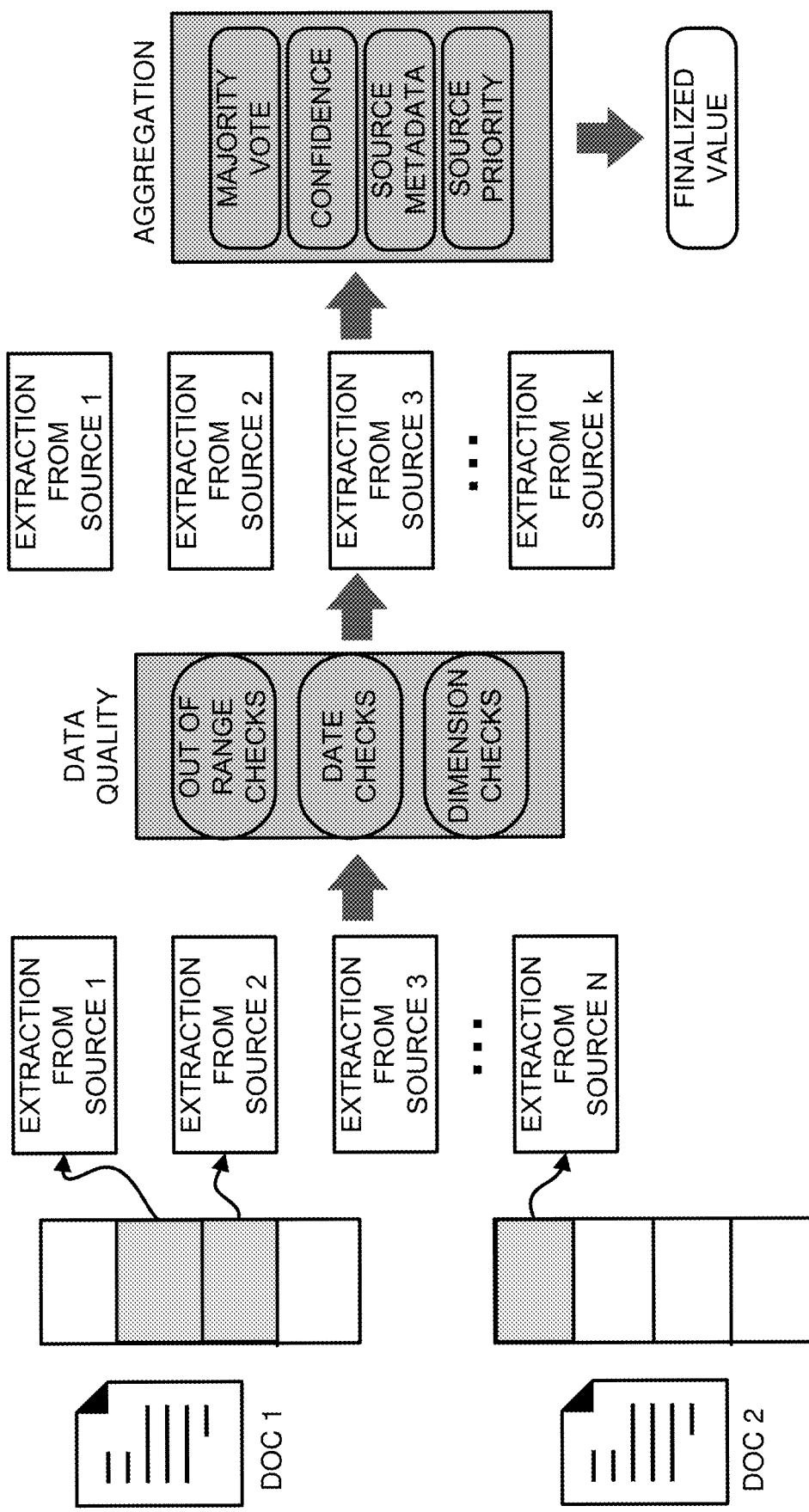
FIG. 9 illustrates a process of performing data quality checks on attribute values extracted from multiple sources according to an embodiment.

FIG. 9 shows example data quality checks that may be performed in some embodiments. Attribute value pairs extracted from relevant pages (shown in gray) of multiple documents may be checked for data quality according to some embodiments. For example, attribute values may be checked for values that are out of range. As an example, if a valid range includes 1 through 100, a value of less than 1 or greater than 100 would be determined to be out of range. Dates may be checked to determine that an order in which a sequence of events is generated as expected. For example, in a field of oil drilling, a well spud is expected to have an earlier date than a drilling completion date. Dimension checks also may be performed on attribute values according to some embodiments. For example, attribute values related to measurements may be checked to determine if these attribute values use certain specific units of measurement such as, for example, meters, feet, miles, kilometers, etc. If units of measurements other than the certain specific units of measurement are detected, then a corresponding attribute value fails the dimension check. In various embodiments, attribute values that fail any of the data quality checks may be discarded. Otherwise, attribute values that pass the data quality checks may be aggregated, and conflicting attribute values may be resolved using, for example, majority vote, confidence probability, and source priority as previously discussed to produce a finalized value. In some embodiments, conflicting attribute values also may be resolved based on source metadata such as, for example, attribute name or other source metadata.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software code can be stored in memory units and executed by processors. The memory unit can be implemented within the processor or external to the processor, in which case it can be communicatively coupled to the processor via various means as is known in the art.

Figure 10:
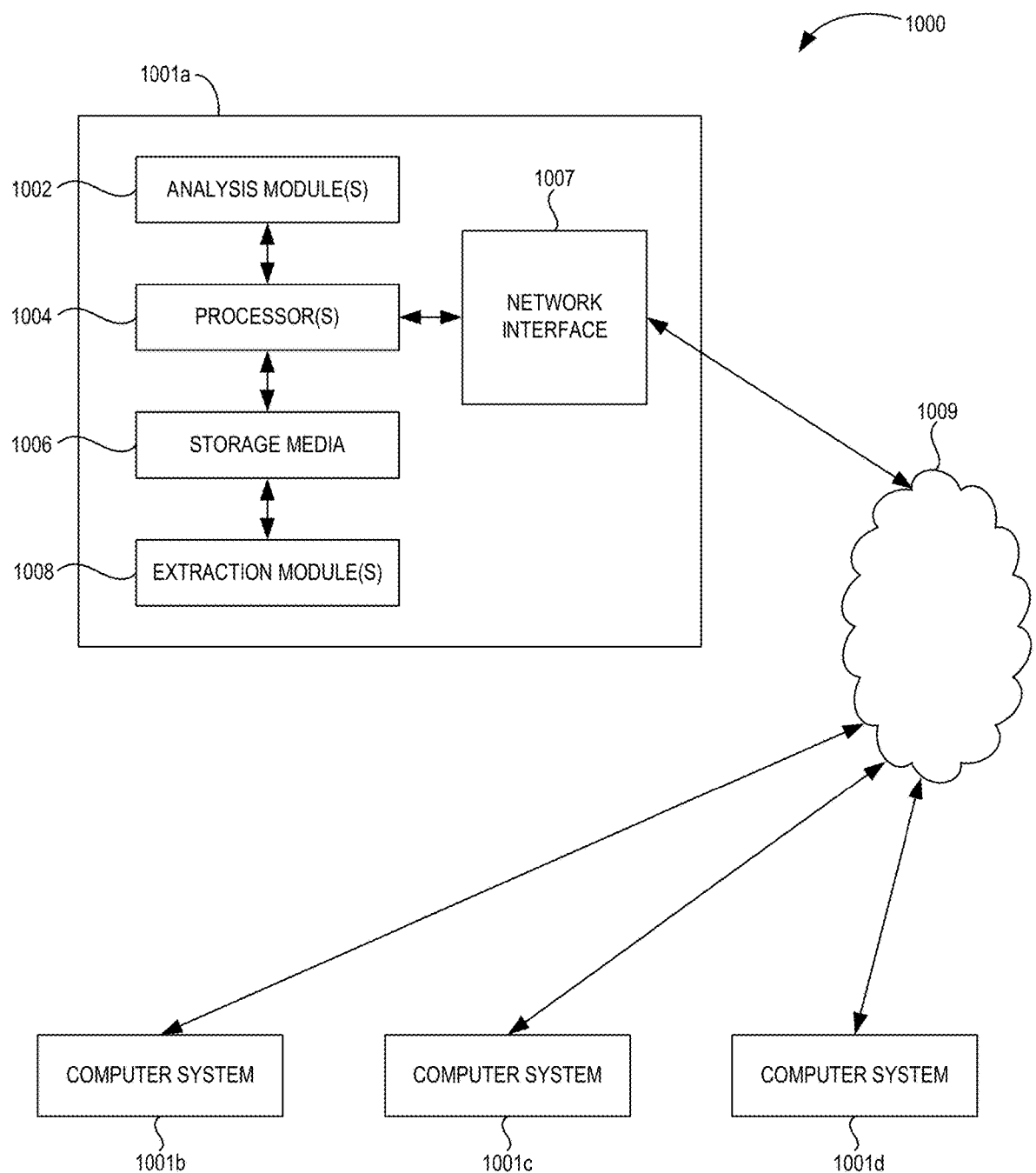
FIG. 10 illustrates a schematic view of a computing system, according to an embodiment.

In some embodiments, any of the methods of the present disclosure may be executed using a system, such as a computing system. FIG. 10 illustrates an example of such a computing system 1000, in accordance with some embodiments. The computing system 1000 may include a computer or computer system 1001a, which may be an individual computer system 1001a or an arrangement of distributed computer systems. The computer system 1001a includes one or more analysis module(s) 1002 configured to perform various tasks according to some embodiments, such as one or more methods disclosed herein. To perform these various tasks, the analysis module 1002 executes independently, or in coordination with, one or more processors 1004, which is (or are) connected to one or more storage media 1006. The processor(s) 1004 is (or are) also connected to a network interface 1007 to allow the computer system 1001a to communicate over a data network 1009 with one or more additional computer systems and/or computing systems, such as 1001b, 1001c, and/or 1001d (note that computer systems 1001b, 1001c and/or 1001d may or may not share the same architecture as computer system 1001a, and may be located in different physical locations, e.g., computer systems 1001a and 1001b may be located in a processing facility, while in communication with one or more computer systems such as 1001c and/or 1001d that are located in one or more data centers, and/or located in varying countries on different continents).

A processor can include a microprocessor, microcontroller, processor module or subsystem, programmable integrated circuit, programmable gate array, or another control or computing device.

The storage media 1006 can be implemented as one or more computer-readable or machine-readable storage media. Note that while in the example embodiment of FIG. 10 storage media 1006 is depicted as within computer system 1001a, in some embodiments, storage media 1006 may be distributed within and/or across multiple internal and/or external enclosures of computing system 1001a and/or additional computing systems. Storage media 1006 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1000 contains one or more extraction module(s) 1008. In some embodiments, a single extraction module 1008 may be used to perform some or all aspects of one or more embodiments of the methods. In alternate embodiments, a plurality of extraction modules 1008 may be used to perform some or all aspects of methods.

It should be appreciated that computing system 1000 is only one example of a computing system, and that computing system 1000 may have more or fewer components than shown, may combine additional components not depicted in the example embodiment of FIG. 10, and/or computing system 1000 may have a different configuration or arrangement of the components depicted in FIG. 10. The various components shown in FIG. 10 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1000, FIG. 10), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. Further, in some embodiments, instead of retrieving documents related to a particular well identifier, documents may be retrieved based on another attribute value of combination of attribute values. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for extracting text associated with user-defined attributes from a plurality of documents, the method comprising:
 identifying relevant documents related to a specific entity from storage based on document metadata;
 extracting text and spatial coordinates of the text based on pages of the relevant documents;
 identifying significant document entities and associated spatial locations of the significant document entities based on the pages of the relevant documents through page layout analysis;
 ranking the pages of the relevant documents based on the extracted text and the spatial coordinates, the identified significant document entities, and image vector representations of the pages;

extracting the user-defined attributes from the pages of the relevant documents using a deep learning language model that utilizes the text and the spatial coordinates, layout information of the document entities, and the image vector representations of the pages;

aggregating first attribute values associated with the user-defined attributes from at least some of the pages of one of the relevant documents into a single record;

aggregating second attribute values associated with the user-defined attributes across the relevant documents;

aggregating, by the computing device, an attribute value across multiple sources based on at least one of a majority vote from among the multiple sources, a confidence probability of the attribute value from among the multiple sources, source metadata, and source priority; and writing aggregated records to a database, each of the aggregated records including a first attribute value or a second attribute value.

2. The method of claim 1, further comprising processing, by attribute-specific parsers executing on a computing device, extracted geographic coordinates, date-specific attributes, and quantities associated with units of measurement.

3. The method of claim 1, wherein the specific entity is either a specific oil well or is associated with one from a group consisting of a wellbore, a field, a basin, and a prospect, wherein the prospect is an area of exploration in which hydrocarbons are predicted to exist.

4. The method of claim 3, wherein the relevant documents are reports related to the specific oil well.

5. The method of claim 1, wherein: the ranking further comprises ranking the pages of the relevant documents based on at least one retrieval method, and the at least one retrieval method includes at least one of term frequency-inverse document frequency (TFIDF) and Okapi Best Match 25 (Okapi BM25).

6. The method of claim 1, wherein the significant document entities comprise headings, paragraphs, tables, forms, figures, and logs.

7. The method of claim 1, wherein: the user-defined attributes are entity-specific attributes, and each of the user-defined attributes is extracted by at least one of a named entity recognition task and an extractive question-answering task.

8. A computer system for extracting text associated with user-defined attributes from a plurality of documents, the computer system comprising:
   at least one processor; and
   at least one memory connected with the at least one processor, the at least one processor being configured to perform a plurality of operations comprising:
   identifying relevant documents related to a specific entity from storage based on document metadata;
   extracting text and spatial coordinates of the text based on pages of the relevant documents;
   identifying significant document entities and associated spatial locations of the significant document entities based on the pages of the relevant documents through page layout analysis;
   ranking the pages of the relevant documents based on the extracted text and the spatial coordinates, the identified significant document entities, and the image vector representations of the pages;
   extracting user-defined attributes from the pages of the relevant documents using a deep learning language model that utilizes the text and the spatial coordinates, layout information of the document entities, and the image vector representations of the pages;
   aggregating first attribute values associated with the user-defined attributes from at least some of the pages of the relevant documents into a single record;
   aggregating second attribute values associated with the user-defined attributes across the relevant documents;
   aggregating, by the computing device, an attribute value across multiple sources based on at least one of a majority vote from among the multiple sources, a confidence probability of the attribute value from among the multiple sources, source metadata, and source priority; and
   writing aggregated records to a database, each of the aggregated records including a first attribute value or a second attribute value.

9. The computer system of claim 8, wherein the plurality of operations further comprise processing, by attribute-specific parsers, extracted geographic coordinates, date-specific attributes, and quantities associated with units of measurements.

10. The computer system of claim 8, wherein the specific entity is either a specific oil well or is associated with one from a group consisting of a wellbore, a field, a basin, and a prospect, wherein the prospect is an area of exploration in which hydrocarbons are predicted to exist.

11. The computer system of claim 10, wherein the relevant documents are reports related to the specific oil well.

12. The computer system of claim 8, wherein: the ranking further comprises ranking the pages of the relevant documents based on at least one retrieval method, and the at least one retrieval method includes at least one of term frequency-inverse document frequency (TFIDF) and Okapi Best Match 25 (Okapi BM25).

13. The computer system of claim 8, wherein the significant document entities comprise headings paragraphs, tables, forms, figures, and logs.

14. The computer system of claim 8, wherein: the user-defined attributes are entity-specific attributes, and each of the user-defined attributes is extracted by at least one of a named entity recognition task and an extractive question-answering task.

15. A non-transitory computer-readable medium having instructions for a processor recorded thereon to configure the processor to perform a plurality of operations comprising:
   identifying relevant documents related to a specific entity from storage based on document metadata;
   extracting text and spatial coordinates of the text from based on pages of the relevant documents;
   identifying significant document entities and associated spatial locations of the significant document entities based on the pages of the relevant documents through page layout analysis;
   ranking the pages of the relevant documents based on the extracted text and the spatial coordinates, the identified significant document entities, and the image vector representations of the pages;
   extracting user-defined attributes from the pages of the relevant documents based on using a deep learning language model that utilizes the text and the spatial coordinates, layout information of the document entities, and the image vector representations of the pages;
   aggregating first attribute values associated with the user-defined attributes from at least some of the pages of the relevant documents into a single record;

aggregating, by the computing device, second attribute values associated with the user-defined attributes across the relevant documents;

aggregating, by the computing device, an attribute value across multiple sources based on at least one of a majority vote from among the multiple sources, a confidence probability of the attribute value from among the multiple sources, source metadata, and source priority; and writing aggregated records to a database, each of the aggregated records including a first attribute value or a second attribute value.

16. The non-transitory computer-readable medium of claim 15, wherein the plurality of operations further comprise processing, by attribute-specific parsers, extracted geographic coordinates, date-specific attributes, and quantities associated with units of measurements.

17. The non-transitory computer-readable medium of claim 15, wherein the specific entity is either a specific oil well or is associated with one from a group consisting of a wellbore, a field, a basin, and a prospect, wherein the prospect is an area or exploration in which hydrocarbons are predicted to exist.

18. The non-transitory computer-readable medium of claim 17, wherein the relevant documents are reports related to the specific oil well.

19. The non-transitory computer-readable medium of claim 15, wherein: the ranking further comprises ranking the pages of the relevant documents based on at least one retrieval method, and the at least one retrieval method includes at least one of term frequency-inverse document frequency (TFIDF) and Okapi Best Match 25 (Okapi BM25).

20. The non-transitory computer-readable medium of claim 15, wherein the significant entities comprise headings paragraphs, tables, forms, figures, and logs.

21. The non-transitory computer-readable medium of claim 15, wherein: the user-defined attributes are entity-specific attributes, and each of the user-defined attributes is extracted by at least one of a named entity recognition task and an extractive question-answering task.

* * * * *